US009237122B2

(12) United States Patent
Feng

(10) Patent No.: US 9,237,122 B2
(45) Date of Patent: Jan. 12, 2016

(54) METHOD AND APPARATUS FOR ADDING RECIPIENT INFORMATION

(75) Inventor: Yuhui Feng, Guangdong (CN)

(73) Assignee: YULONG COMPUTER TELECOMMUNICATION TECHNOLOGIES (SHENZHEN) CO., LTD., Guangdong (CN)

( * ) Notice: Subject to any disclaimer, the term of this patent is extended or adjusted under 35 U.S.C. 154(b) by 84 days.

(21) Appl. No.: 13/981,910

(22) PCT Filed: Jan. 25, 2011

(86) PCT No.: PCT/CN2011/070609
§ 371 (c)(1),
(2), (4) Date: Jul. 25, 2013

(87) PCT Pub. No.: WO2012/100409
PCT Pub. Date: Aug. 2, 2012

(65) Prior Publication Data
US 2013/0311589 A1 Nov. 21, 2013

(51) Int. Cl.
*H04L 12/58* (2006.01)
*G06Q 10/10* (2012.01)
(52) U.S. Cl.
CPC .............. *H04L 51/28* (2013.01); *G06Q 10/107* (2013.01); *H04L 51/38* (2013.01)
(58) Field of Classification Search
CPC ......... H04L 51/04; H04L 51/14; H04L 51/28; H04L 63/0245; H04L 63/102
USPC ........................... 709/206, 203, 207, 205, 227
See application file for complete search history.

(56) References Cited

U.S. PATENT DOCUMENTS

| 8,103,726 | B2* | 1/2012 | Stoddard et al. | 709/206 |
|---|---|---|---|---|
| 8,364,767 | B2* | 1/2013 | Brady et al. | 709/206 |
| 8,738,634 | B1* | 5/2014 | Roth et al. | 707/748 |
| 2006/0179114 | A1* | 8/2006 | Deeds | 709/206 |
| 2007/0245006 | A1* | 10/2007 | Lehikoinen et al. | 709/223 |
| 2007/0288578 | A1* | 12/2007 | Pantalone | 709/206 |
| 2008/0313283 | A1 | 12/2008 | Cohen et al. | |
| 2010/0070910 | A1* | 3/2010 | Zimmerman et al. | 715/781 |
| 2012/0011426 | A1* | 1/2012 | Yach | 715/208 |

FOREIGN PATENT DOCUMENTS

CN        101943954 A       1/2011

OTHER PUBLICATIONS

Search Report issued in International Application No. PCT/CN2011/070609 dated Mar. Nov. 3, 2011.

* cited by examiner

*Primary Examiner* — Ruolei Zong
(74) *Attorney, Agent, or Firm* — Scully, Scott, Murphy & Presser, P.C.

(57) ABSTRACT

A method and an apparatus for adding recipient information are disclosed in the present invention, which relate to the field of communication technologies and are proposed in order to solve the problem in the prior art that the recipient information cannot be added according to the message content edited by the user. The technical solutions provided by the embodiments of the present invention comprise: matching message content edited by a user with contact information in an address book to obtain matched characters in the message content; acquiring corresponding contact information of the matched characters from the address book; and adding corresponding contact information of the matched characters into an recipient list corresponding to the message content. The embodiments of the present invention can be applied into mobile terminals such as the cell phone.

16 Claims, 8 Drawing Sheets

METHOD AND APPARATUS FOR ADDING RECIPIENT INFORMATION

RELATED APPLICATIONS

This application is the U.S. National Phase under 35 U.S.C. §371 of International Application No. PCT/CN2011/070609, filed on Jan. 25, 2011, the disclosure of which is incorporated by reference herein.

TECHNICAL FIELD

The present invention relates to the field of communication technologies, and particularly, to an recipient information adding method and apparatus.

BACKGROUND

Currently, when a user uses a device like mobile terminal to send messages, such as short messages, multimedia messages and Electronic mail (Email) using, he needs to add recipient information (e.g., telephone number of the recipient, Email addresses of the recipient and the CC, etc.) into an recipient list. The user may input the recipient information into the recipient list word for word, or import corresponding recipient information from the address book.

When the recipient information is added with the above methods, the inventor finds that the prior art at least has the following problem: either of the recipient information adding methods requires the user to manually add the recipient information, and the mobile terminal cannot add the recipient information according to the message content edited by the user.

SUMMARY

The embodiments of the present invention provide an recipient information adding method and apparatus, which can add the recipient information according to the message content edited by the user.

One aspect provides an recipient information adding method, comprising: matching message content edited by a user with contact information in an address book to obtain matched characters in the message content; acquiring corresponding contact information of the matched characters from the address book; and adding corresponding contact information of the matched characters into an recipient list corresponding to the message content.

Another aspect provides an recipient information adding method, comprising: matching a first line of a mail content edited by a user with contact information in an address book to obtain recipient matched characters in the mail content; acquiring corresponding contact information of the recipient matched characters from the address book; and adding corresponding contact information of the recipient matched characters into an recipient list corresponding to the mail content.

Still another aspect provides an recipient information adding apparatus, comprising: an information matching module configured to match message content edited by a user with contact information in an address book to obtain matched characters in the message content; an information acquiring module configured to acquire from the address book corresponding contact information of the matched characters obtained by the information matching module; and an information adding module configured to add corresponding contact information of the matched characters obtained by the information acquiring module into an recipient list corresponding to the message content.

Yet another aspect provides an recipient information adding apparatus, comprising: an recipient matching module configured to match a first line of a mail content edited by a user with contact information in an address book to obtain recipient matched characters in the mail content; an recipient acquiring module configured to acquire from the address book corresponding contact information of the recipient matched characters obtained by the recipient matching module; and an recipient adding module configured to add corresponding contact information of the recipient matched characters obtained by the recipient acquiring module into an recipient list corresponding to the mail content.

The recipient information adding method and apparatus provided by the embodiments of the present invention obtain matched characters by matching the message content edited by the user with the contact information, acquire corresponding contact information of the matched characters, and add it into the recipient list, thereby realizing adding the recipient information according to the message content edited by the user. The embodiments of the present invention solve the problem in the prior art that the recipient information cannot be added according to the message content edited by the user.

BRIEF DESCRIPTIONS OF THE DRAWINGS

In order to more clearly describe the technical solutions of the prior art or the embodiments of the present invention, the drawings to be used in the descriptions of the prior art or the embodiments will be briefly introduced as follows. Obviously, the following drawings just illustrate some of the embodiments of the present invention, and a person skilled in the art can obtain other drawings from these drawings without paying creative effort.

DETAILED DESCRIPTIONS OF THE EMBODIMENTS

The technical solutions of the embodiments of the present invention will be clearly and completely described as follows with reference to the drawings. Obviously, those described herein are just parts of the embodiments of the present invention rather than all the embodiments. Based on the embodiments of the present invention, any other embodiment obtained by a person skilled in the art without paying any creative effort shall fall within the protection scope of the present invention.

In order to solve the problem in the prior art that the recipient information cannot be added according to the message content edited by the user, the embodiments of the present invention provides an recipient information adding method and apparatus.

Figure 1:
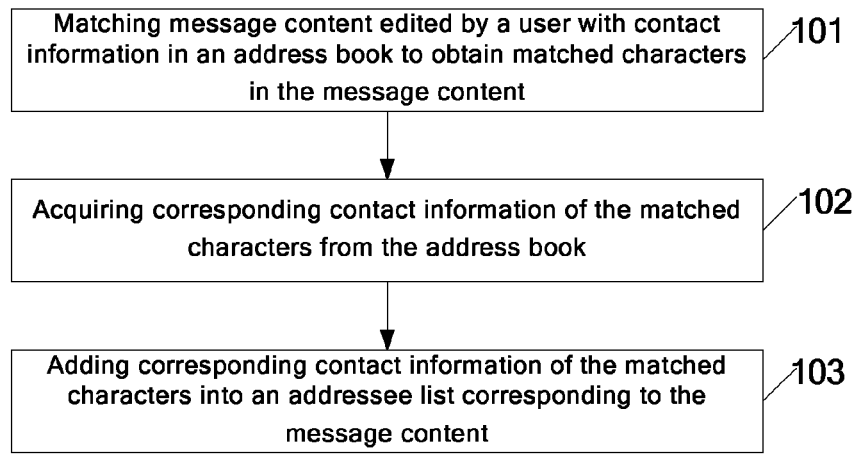
FIG. 1 is a flowchart of a method for adding recipient information provided by Embodiment 1 of the present invention.

As illustrated in FIG. 1, the recipient information adding method provided by Embodiment 1 of the present invention includes:

Step 101: matching message content edited by a user with contact information in an address book to obtain matched characters in the message content.

In this embodiment, the process of matching the message content edited by the user with the contact information in the address book in step 101 may include: acquiring the message content edited by the user, and acquiring the contact information in the address book; comparing the message content with the contact information, and when the characters contained in the message content include the characters contained in the contact information, the characters contained in the message content are the matched characters.

In this embodiment, step 101 may timely match the message content edited by the user with the contact information in the address book, along with the message content being edited by the user; or match the message content with the contact information in the address book after the user finishes editing all the message content. Step 101 may be used to judge whether the message content edited by the user contains the contact information, and if so, the characters in the message content containing the contact information are the matched characters. In which, the message content edited by the user may include short messages, multimedia messages, mail content, etc., which is not detailed herein.

Step 102: acquiring corresponding contact information of the matched characters from the address book.

In this embodiment, after obtaining the matched characters by matching the message content edited by the user, the mobile terminal may start a program for invoking the contact, so as to acquire corresponding contact information of the matched characters from the address book.

Step 103: adding corresponding contact information of the matched characters into an recipient list corresponding to the message content.

In this embodiment, step 103 may add corresponding contact information of the matched characters into the recipient list. When the message is to be transmitted, the program for invoking the contact is needed to obtain corresponding contact way of the contact; or the contact way of the contact corresponding to corresponding contact information of the matched characters may be directly added into the recipient list; the mobile terminal may also acquire the contact information in other manners, which are not detailed herein.

In this embodiment, when the contact information is a contact name, the contact name may be added into the recipient list; and when the contact information is a contact group name, all contact names in the contact group may be added into the recipient list, which is not detailed herein.

In this embodiment, when there are more than one piece of corresponding contact information of the matched characters, the recipient list may display the respective pieces of contact information with a list, or using separators, or in other manners, which are not detailed herein.

In this embodiment, when the message to be transmitted by the user with the mobile terminal is newly created message or forwarded message, the mobile terminal may match the message content edited by the user with the contact information in the address book, acquire corresponding contact information of the matched characters from corresponding contact information of the matched characters, and add it into the recipient list, thereby realizing intelligently adding the recipient information according to the message content edited by the user.

The recipient information adding method provided by the embodiment of the present invention can add the recipient information according to the message content edited by the user. When the user does not want to use the recipient information adding method provided by the embodiment of the present invention, he also can input the recipient information into the recipient list word for word, or import corresponding recipient information from the address book, which herein is not detailed.

The recipient information adding method provided by the embodiment of the present invention obtains matched characters by matching the message content edited by the user with the contact information, acquires corresponding contact information of the matched characters, and adds it into the recipient list, thereby realizing adding the recipient information according to the message content edited by the user. The embodiment of the present invention solves the problem in the prior art that the recipient information cannot be added according to the message content edited by the user.

Figure 2:
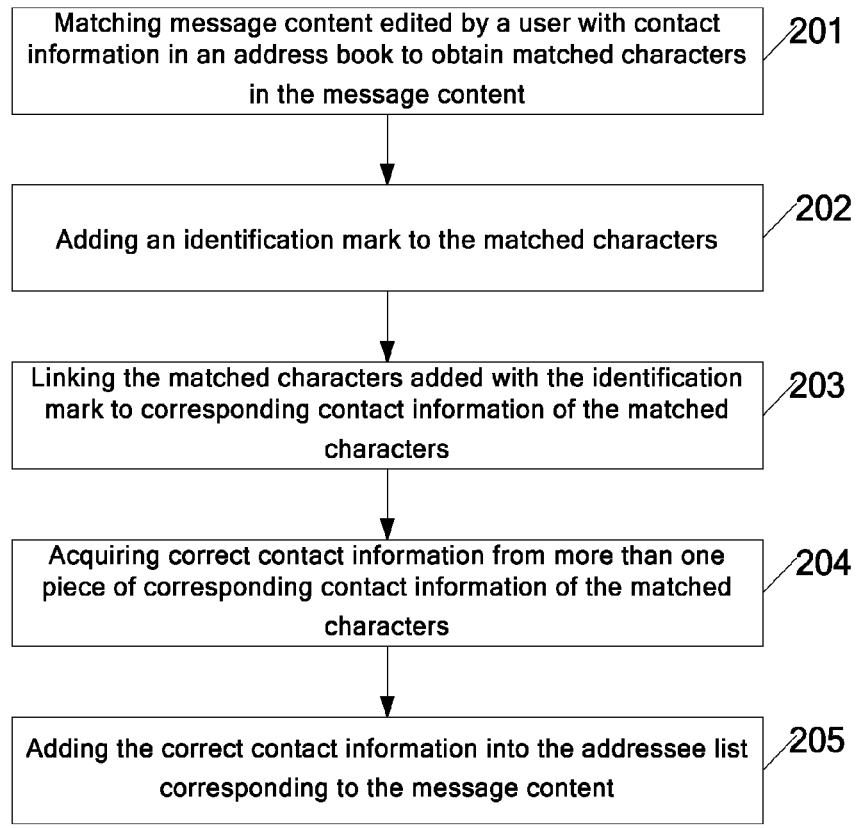
FIG. 2 is a flowchart of a method for adding recipient information provided by Embodiment 2 of the present invention.

As illustrated in FIG. 2, the recipient information adding method provided by Embodiment 2 of the present invention includes:

Step 201: matching message content edited by a user with contact information in an address book to obtain matched characters in the message content.

In this embodiment, the contact information in step 201 may include the contact name and/or the contact group name. In step 201, the process of obtaining the matched characters is similar to the obtaining process in step 101 as illustrated in FIG. 1, and herein is not detailed.

In this embodiment, the process of matching the message content edited by the user with the contact name in the contact information may include:

I. Completely matching the message content edited by the user with the contact name in the contact information to obtain the matched characters in the message content.

In this embodiment, the process of completely matching the message content edited by the user with the contact name may include: acquiring the message content edited by the user, and acquiring the contact name in the contact information; comparing the message content with the contact name, and when the characters contained in the message content include all the characters contained in the contact name, the characters contained in the message content are the matched characters.

In this embodiment, step 201 may timely and completely match the message content edited by the user with the contact name in the address book, along with the message content being edited by the user; or completely match the message content with the contact name in the address book after the user finishes editing all the message content. Step 201 may be used to judge whether the message content edited by the user contains the contact name, and if so, the characters in the message content containing the contact name are the matched characters.

In this embodiment, the matched characters accurately matched with the contact name can be obtained by completely matching the message content with the contact name.

And/or

II. Partially matching the message content with the contact name in the contact information to obtain the matched characters in the message content.

In this embodiment, since the family name and the given name of the contact name may be edited respectively when editing the address book by some mobile terminals, while the message content may only include the given name of the contact name when editing the message content by the user, the message content may be partially matched with the given name of the contact name to obtain the matched characters in the message content.

In this embodiment, the message content is partially matched with the given name of the contact name. For the detailed matching process, please refer to the process of completely matching the message content edited by the user with the contact name in the contact information, and herein is not detailed.

In this embodiment, in order to save the matching time for the mobile terminal to match the message content edited by the user with the contact name, the partial matching may be only performed for the message content other than the matched characters obtained through the complete matching; the partial matching may also be performed for all message content edited by the user, including the matched characters obtained through the complete matching, and herein is not detailed.

In this embodiment, matched characters accurately matched with the contact name can be obtained by completely matching the message content with the contact name; and matched characters fuzzily matched with the contact name can be obtained by partially matching the message content with the given name of the contact name.

In this embodiment, the process of matching the message content edited by the user with the contact name may include the complete matching only, the partial matching only, or both the complete matching and the partial matching, which is not detailed herein.

Step 202: adding an identification mark to the matched characters.

In this embodiment, in order that the user acquires which characters in the information content edited by the user are the matched characters, after obtaining the matched characters by matching the information content with the contact information, the mobile terminal adds the identification mark to the matched characters.

In this embodiment, step 202 may add the identification mark to the matched characters as follows: adding an underline to the matched characters; or adding a background color to the matched characters so that the matched characters are highlighted; or changing the matched characters into icon buttons, so that the user identifies which characters in the message content are the matched characters.

In this embodiment, except those above methods, there may be other methods for adding the identification mark to the matched characters, and herein are not detailed.

Step 203: linking the matched characters added with the identification mark to corresponding contact information of the matched characters.

Step 204: acquiring correct contact information from more than one piece of corresponding contact information of the matched characters.

In this embodiment, the mobile terminal may display the more than one piece of corresponding contact information of the matched characters in a list on the user edit page. The user shall select one or more pieces of correct contact information from the more than one piece of contact information, so that the mobile terminal acquires the correct contact information from the more than one piece of corresponding contact information of the matched characters.

In this embodiment, step 204 may acquire the correct contact information, along with the obtaining of the matched characters from the message content being edited by the user; or acquire the correct contact information after the message is finished editing and the matched characters of all the message content edited by the user are obtained, which is not detailed herein.

In this embodiment, step 203 links the matched characters added with the identification mark to corresponding contact information of the matched characters, so that after the user performs a certain operation on the matched characters added with the identification mark, the mobile terminal displays corresponding contact information of the matched characters. In which, the operation may include shortly clicking the matched characters added with the identification mark, and herein is not detailed.

Step 205: adding the correct contact information into the recipient list corresponding to the message content.

In this embodiment, step 205 may add the correct contact information into the recipient list. When the information is to be transmitted, the program for invoking the contact is needed to obtain corresponding contact way of the contact; or the contact way of the contact corresponding to the correct contact information may be directly added into the recipient list; the mobile terminal may also add the contact information in other manners, which are not detailed herein.

In this embodiment, when step 204 acquires multiple pieces of correct contact information and step 205 adds the correct contact information into the recipient list, the recipient list may display the respective pieces of contact information with a list, or using separators, or in other manners, which are not detailed herein.

In this embodiment, when the information to be transmitted by the user with the mobile terminal is newly created information or forwarded information, the mobile terminal may match the message content edited by the user with the contact information in the address book, acquire the correct contact information from corresponding contact information of the matched characters, and add it into the recipient list, thereby realizing intelligently adding the recipient information according to the message content edited by the user.

In the recipient information adding method provided by the embodiment of the present invention, the recipient information can be added according to the message content edited by the user regardless of whether the message content edited by the user contains the family name and the given name of the recipient, or only the given name of the recipient, or the contact group name, thereby improving the user experiences.

The recipient information adding method provided by the embodiment of the present invention can add the recipient information according to the message content edited by the user. When the user does not want to use the recipient information adding method provided by the embodiment of the present invention, he also can input the recipient information into the recipient list word for word, or import corresponding recipient information from the address book, herein is not detailed.

In this embodiment, the message content edited by the user may include short messages, multimedia messages, mail content, etc., which is not detailed herein. When the contact information is a contact name, the contact name may be added into the recipient list; and when the contact information is a contact group name, all contact names in the contact group may be added into the recipient list, which is not detailed herein.

The recipient information adding method provided by the embodiment of the present invention obtains matched characters by matching the message content edited by the user with the contact information, acquires corresponding contact information of the matched characters, and adds it into the recipient list, thereby realizing adding the recipient information according to the message content edited by the user. The embodiment of the present invention solves the problem in the prior art that the recipient information cannot be added according to the message content edited by the user.

Figure 3:
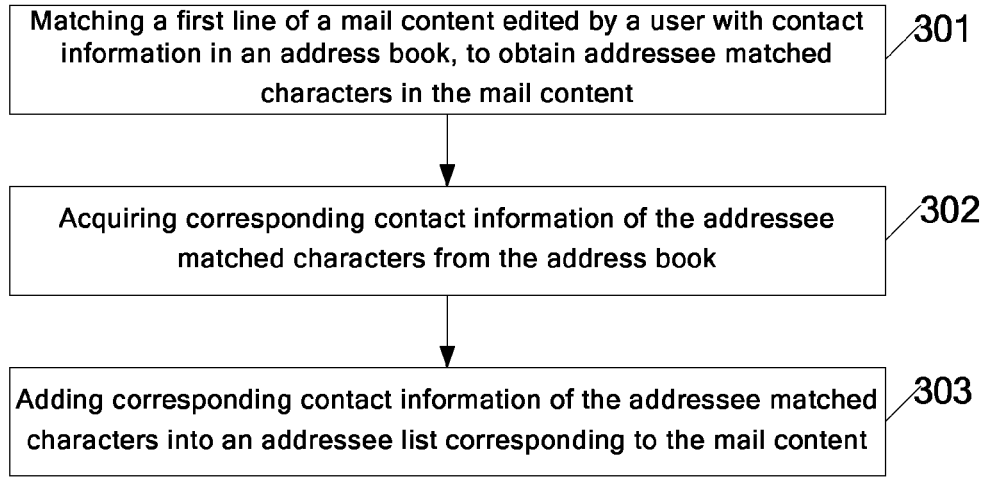
FIG. 3 is a flowchart of a method for adding recipient information provided by Embodiment 3 of the present invention.

As illustrated in FIG. 3, the recipient information adding method provided by Embodiment 3 of the present invention includes:

Step 301: matching a first line of a mail content edited by a user with contact information in an address book, to obtain recipient matched characters in the mail content.

In this embodiment, the process of matching the first line of the mail content edited by the user with the contact information in the address book in step 301 may include: acquiring the first line of the mail content edited by the user, and acquiring the contact information in the address book; comparing the first line of the mail content with the contact information, and when the characters contained in the first line of the mail content include the characters contained in the contact information, the characters contained in the first line of the mail content are the recipient matched characters.

In this embodiment, step 301 may timely match the first line of the mail content edited by the user with the contact information in the address book, along with the mail content being edited by the user; or match the first line of the mail content with the contact information in the address book after the user finishes editing all the mail content. Step 301 may be used to judge whether the first line of the mail content edited by the user contains the contact information, and if so, the characters in the mail content containing the contact information are the recipient matched characters.

Step 302: acquiring corresponding contact information of the recipient matched characters from the address book.

In this embodiment, after obtaining the recipient matched characters by matching the first line of the mail content edited by the user, the mobile terminal may start a program for invoking the contact, so as to acquire corresponding contact information of the recipient matched characters from the address book.

Step 303: adding corresponding contact information of the recipient matched characters into an recipient list corresponding to the mail content.

In this embodiment, step 303 may add corresponding contact information of the recipient matched characters into the recipient list. When the information is to be transmitted, the program for invoking the contact is needed to obtain corresponding contact way of the contact; or the contact way of the contact corresponding to corresponding contact information of the recipient matched characters may be directly added into the recipient list; the mobile terminal may also acquire the contact information in other manners, which are not detailed herein.

In this embodiment, when the contact information is a contact name, the contact name may be added into the recipient list; and when the contact information is a contact group name, all contact names in the contact group may be added into the recipient list, which is not detailed herein.

In this embodiment, when there are more than one piece of corresponding contact information of the recipient matched characters, the recipient list may display the respective pieces of contact information with a list, or using separators, or in other manners, which are not detailed herein.

In this embodiment, when the mail to be sent by the user with the mobile terminal is a newly created mail or a forwarded mail, the mobile terminal may match the first line of the mail content edited by the user with the contact information in the address book, acquire corresponding contact information of the matched characters from corresponding contact information of the recipient matched characters, and add it into the recipient list, thereby realizing intelligently adding the recipient information according to the message content edited by the user.

The recipient information adding method provided by the embodiment of the present invention can add the recipient information according to the message content edited by the user. When the user does not want to use the recipient information adding method provided by the embodiment of the present invention, he also can input the recipient information into the recipient list word for word, or import corresponding recipient information from the address book, herein is not detailed.

The recipient information adding method provided by the embodiment of the present invention obtains the recipient matched characters by matching the first line of the mail content edited by the user with the contact information, acquires corresponding contact information of the recipient matched characters, and adds it into the recipient list, thereby realizing adding the recipient information according to the message content edited by the user. The embodiment of the present invention solves the problem in the prior art that the recipient information cannot be added according to the message content edited by the user.

Figure 4:
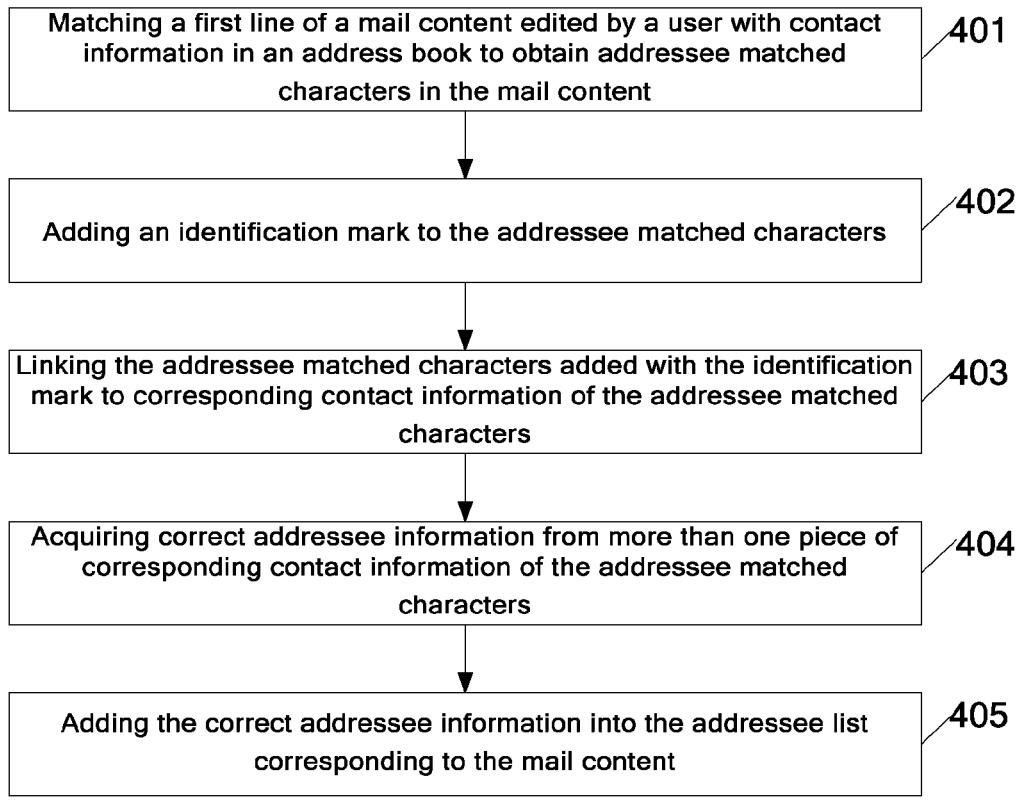
FIG. 4 is a flowchart of a method for adding recipient information provided by Embodiment 4 of the present invention.

As illustrated in FIG. 4, the recipient information adding method provided by Embodiment 4 of the present invention includes:

Step 401: matching a first line of a mail content edited by a user with contact information in an address book to obtain recipient matched characters in the mail content.

In this embodiment, in step 401 the contact information may include the contact name and/or the contact group name. In step 401, the process of obtaining the recipient matched characters is similar to the obtaining process in step 301 as illustrated in FIG. 3, and herein is not detailed.

In this embodiment, the process of matching the first line of the mail content edited by the user with the contact name in the contact information may include:

I. Completely matching the first line of the mail content edited by the user with the contact name in the address book to obtain the recipient matched characters in the mail content.

In this embodiment, the process of completely matching the first line of the mail content edited by the user with the contact name in the address book may include: acquiring the first line of the mail content edited by the user, and acquiring the contact name in the address book; comparing the first line of the mail content with the contact name, and when the characters contained in the mail content include all the characters contained in the contact name, the characters contained in the first line of the mail content are the recipient matched characters.

In this embodiment, step 401 may timely and completely match the first line of the mail content edited by the user with the contact name in the address book, along with the mail content being edited by the user; or completely match the first line of the mail content with the contact name in the address book after the user finishes editing all the mail content. The complete matching may be used to judge whether the first line of the mail content edited by the user contains the contact name, and if so, the characters in the first line of the mail content containing the contact name are the recipient matched characters.

In this embodiment, the recipient matched characters accurately matched with the contact name can be obtained by completely matching the first line of the mail content with the contact name.

And/or

II. Partially matching the first line of the mail content with the given name in the contact information to obtain the recipient matched characters in the mail content.

In this embodiment, since the family name and the given name of the contact name may be edited respectively when editing the address book by some mobile terminals, while the mail content may only include the given name of the contact name when editing the mail content by the user, the first line of the mail content may be partially matched with the given name of the contact name to obtain the recipient matched characters in the mail content.

In this embodiment, the first line of the mail content is partially matched with the given name of the contact name. For the detailed matching process, please refer to the process of completely matching the first line of the mail content edited by the user with the contact name in the address book, and herein is not detailed.

In this embodiment, in order to save the matching time for the mobile terminal to match the mail content edited by the user with the contact name, the partial matching may be only performed for the mail content other than the recipient matched characters obtained through the complete matching; the partial matching may also be performed for all mail content edited by the user, including recipient matched characters obtained through the complete matching, and herein is not detailed.

In this embodiment, recipient matched characters accurately matched with the contact name can be obtained by completely matching the first line of the mail content with the contact name; and recipient matched characters fuzzily matched with the contact name can be obtained by partially matching the first line of the mail content with the given name of the contact name.

In this embodiment, the process of matching the first line of the mail content edited by the user with the contact name may include the complete matching only, the partial matching only, or both the complete matching and the partial matching, which is not detailed herein.

Step 402: adding an identification mark to the recipient matched characters.

In this embodiment, in order that the user acquires which characters in the mail content edited by the user are the recipient matched characters, after the mobile terminal matches the mail content with the contact information and obtains the recipient matched characters, the recipient matched characters are added with the identification mark.

In this embodiment, the methods for adding the identification mark to the recipient matched characters include: adding an underline to the recipient matched characters; or adding a background color to the recipient matched characters so that the recipient matched characters are highlighted; or changing the recipient matched characters into icon buttons, so that the user identifies which characters in the mail content are the recipient matched characters.

In this embodiment, there may be other methods for adding the identification mark to the recipient matched characters, and herein are not detailed.

Step 403: linking the recipient matched characters added with the identification mark to corresponding contact information of the recipient matched characters.

Step 404: acquiring correct recipient information from more than one piece of corresponding contact information of the recipient matched characters.

In this embodiment, the mobile terminal may display the more than one piece of corresponding contact information of the recipient matched characters in a list on the user edit page. The user shall select one or more pieces of correct recipient information from the more than one piece of contact information, so that the mobile terminal acquires the correct recipient information from the more than one piece of corresponding contact information of the recipient matched characters.

In this embodiment, step 404 may acquire the correct recipient information, along with the obtaining of the recipient matched characters from the first line of the mail content being edited by the user; or acquire the correct recipient information after the mail content is finished editing and the recipient matched characters of all the mail content edited by the user are obtained, which is not detailed herein.

In this embodiment, step 403 links the recipient matched characters added with the identification mark to corresponding contact information of the recipient matched characters, so that after the user performs a certain operation on the recipient matched characters added with the identification mark, the mobile terminal displays corresponding contact information of the recipient matched characters. In which, the operation may include shortly clicking the recipient matched characters added with the identification mark, and herein is not detailed.

Step 405: adding the correct recipient information into the recipient list corresponding to the mail content.

In this embodiment, step 405 may add the correct recipient information into the recipient list. When the mail is to be sent, the program for invoking the contact is needed to obtain corresponding contact way of the contact; or the contact way of the contact corresponding to the correct recipient information may be directly added into the recipient list; the mobile terminal may also acquire the contact information in other manners, which are not detailed herein.

In this embodiment, if step 404 acquires multiple pieces of correct recipient information and after step 405 adds the correct recipient information into the recipient list, the recipient list may display the respective pieces of recipient information with a list, or using separators, or in other manners, which are not detailed herein.

In this embodiment, when the mail to be sent by the user with the mobile terminal is a newly created mail or a forwarded mail, the mobile terminal may match the first line of the mail content edited by the user with the contact information in the address book, acquire a correct recipient name from corresponding contact information of the recipient matched characters, and add it into the recipient list, thereby realizing intelligently adding the recipient information according to the message content edited by the user.

In the recipient information adding method provided by the embodiment of the present invention, the recipient information can be added according to the message content edited by the user regardless of whether the first line of the mail content edited by the user contains the family name and the given name of the recipient, or only the given name of the recipient, or the contact group name, thereby improving the user experiences.

The recipient information adding method provided by the embodiment of the present invention can add the recipient information according to the message content edited by the user. When the user does not want to use the recipient information adding method provided by the embodiment of the present invention, he also can input the recipient information into the recipient list word for word, or import corresponding recipient information from the address book, which is not detailed herein.

The recipient information adding method provided by the embodiment of the present invention obtains the recipient matched characters by matching the first line of the mail content edited by the user with the contact information, acquires corresponding contact information of the recipient matched characters, and adds it into the recipient list, thereby adding the recipient information according to the message content edited by the user. The embodiment of the present invention solves the problem in the prior art that the recipient information cannot be added according to the message content edited by the user.

Figure 5:
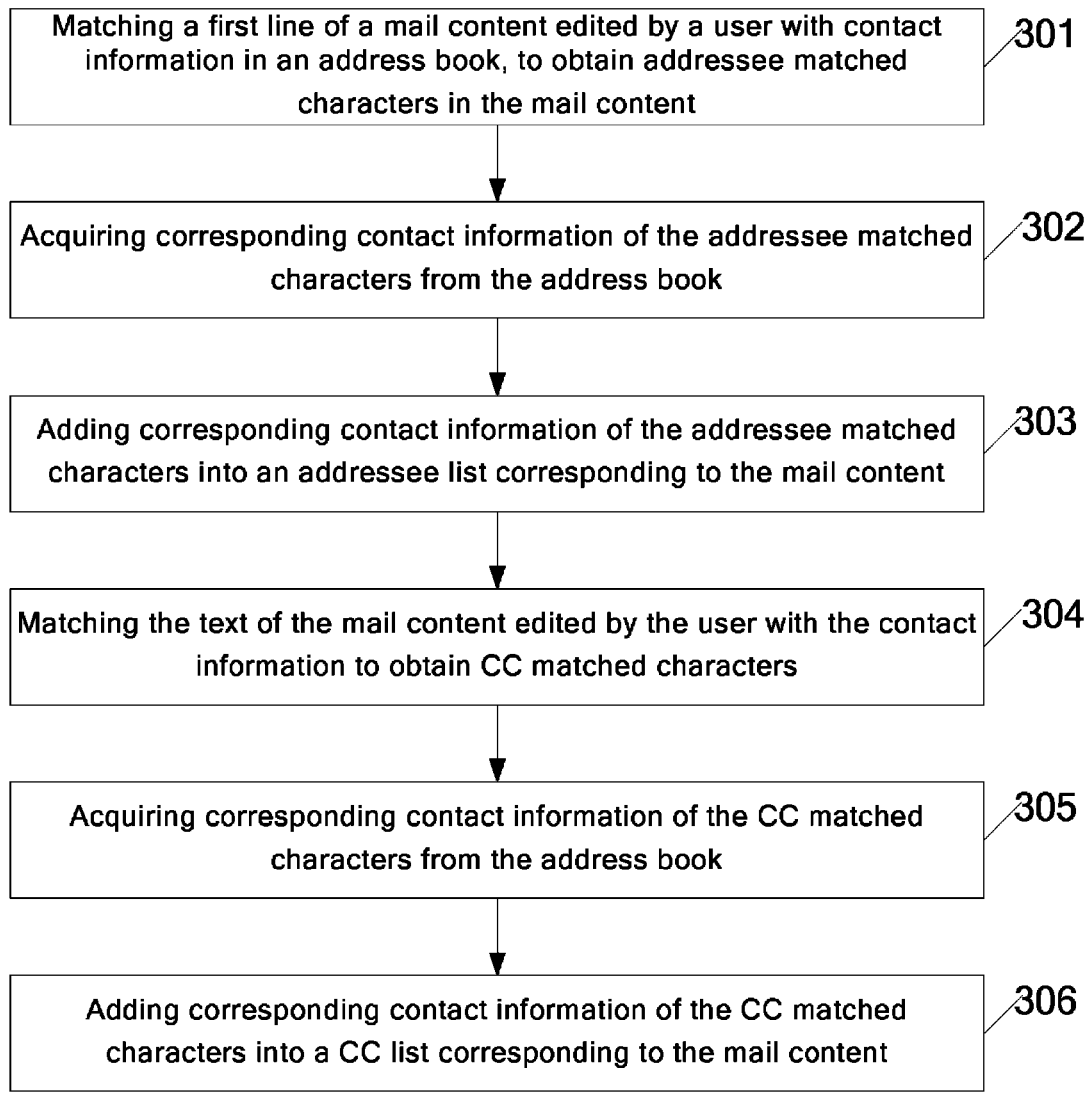
FIG. 5 is a flowchart of a method for adding recipient information provided by Embodiment 5 of the present invention.

As illustrated in FIG. 5, the recipient information adding method provided by Embodiment 5 of the present invention is substantially the same as that illustrated in FIG. 3, and the difference lies in that in order to add the CC information according to the mail content edited by the user when a mail is to be sent, the following steps may be comprised after step 303:

Step 304: matching the text of the mail content edited by the user with the contact information to obtain CC matched characters.

In this embodiment, the process of step 304 of matching the text of the mail content edited by the user with the contact information in the address book in step 304 may include: acquiring the text of the mail content edited by the user, and acquiring the contact information in the address book; comparing the text of the mail content with the contact information, and when the characters contained in the text of the mail content include the characters contained in the contact information, the characters contained in the text of the mail content are the CC matched characters.

In this embodiment, step 304 may timely match the text of the mail content edited by the user with the contact information in the address book, along with the mail content being edited by the user; or match the text of the mail content with the contact information in the address book after the user finishes editing all the mail content. Step 304 may be used to judge whether the text of the mail content edited by the user contains the contact information, and if so, the characters in the mail content containing the contact information are the CC matched characters.

Step 305: acquiring corresponding contact information of the CC matched characters from the address book.

In this embodiment, after obtaining the CC matched characters by matching the text of the mail content edited by the user, the mobile terminal may start a program for invoking the contact, so as to acquire corresponding contact information of the CC matched characters from the address book.

Step 306: adding corresponding contact information of the CC matched characters into a CC list corresponding to the mail content.

In this embodiment, step 306 may add corresponding contact information of the CC matched characters into the CC list. When the information is to be transmitted, the program for invoking the contact is needed to obtain corresponding contact way of the contact; or the contact way of the contact corresponding to corresponding contact information of the CC matched characters may be directly added into the CC list; the mobile terminal may also add the contact information in other manners, which are not detailed herein.

In this embodiment, when there are more than one piece of corresponding contact information of the recipient/CC matched characters, the recipient/CC list may display the respective pieces of contact information with a list, or using separators, or in other manners, which are not detailed herein.

In this embodiment, when the mail to be sent by the user with the mobile terminal is a newly created mail or a forwarded mail, the mobile terminal may match the first line/text of the mail content edited by the user with the contact information in the address book, acquire corresponding contact information of the recipient/CC matched characters from corresponding contact information of the recipient/CC matched characters, and add into the recipient/CC list, thereby realizing intelligently adding recipient/CC information according to the mail content edited by the user.

The recipient information adding method provided by the embodiment of the present invention can add the recipient/CC information according to the mail content edited by the user. When the user does not want to use the recipient information adding method provided by the embodiment of the present invention, he also can input the recipient/CC information into the recipient list word for word, or import corresponding recipient/CC information from the address book, which is not detailed herein.

The recipient information adding method provided by the embodiment of the present invention obtains recipient/CC matched characters by matching the first line/text of the mail content edited by the user with the contact information, acquires corresponding contact information of the recipient/CC matched characters, and adds it into the recipient/CC list, thereby realizing adding the recipient information according to the message content edited by the user. The embodiment of the present invention solves the problem in the prior art that the recipient information cannot be added according to the message content edited by the user.

Figure 6:
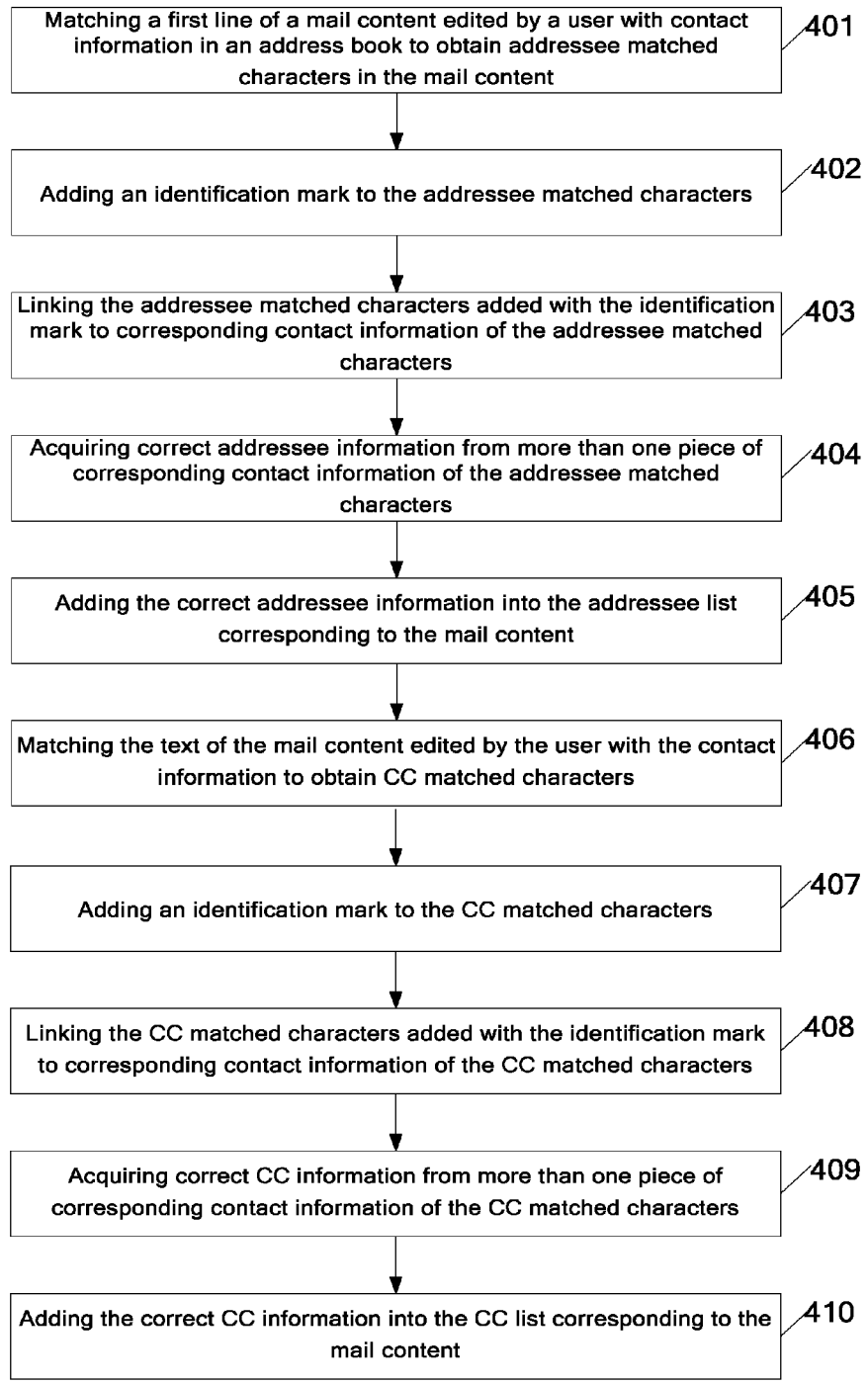
FIG. 6 is a flowchart of a method for adding recipient information provided by Embodiment 6 of the present invention.

As illustrated in FIG. 6, the recipient information adding method provided by Embodiment 6 of the present invention is substantially the same as that illustrated in FIG. 4, and the difference lies in that in order to add the CC information according to the mail content edited by the user when a mail is to be sent, the following steps may be comprised after step 405:

Step 406: matching the text of the mail content edited by the user with the contact information to obtain CC matched characters.

In this embodiment, the contact information in step 406 may include the contact name and/or the contact group name. In step 406, the process of obtaining the matched characters is similar to the obtaining process in step 304 as illustrated in FIG. 5, and herein is not detailed.

In this embodiment, the process of matching the text of the mail content edited by the user with the contact name in the contact information may include:

I. Completely matching the text of the mail content edited by the user with the contact information in the address book to obtain the CC matched characters in the mail content.

In this embodiment, the process of completely matching the text of the mail content edited by the user with the contact name in the address book may include: acquiring the text of the mail content edited by the user, and acquiring the contact name in the address book; comparing the text of the mail content with the contact name, and when the characters contained in the mail content include all the characters contained in the contact name, the characters contained in the mail content are the CC matched characters.

In this embodiment, step 406 may timely and completely match the text of the mail content edited by the user with the contact name in the address book, along with the mail content being edited by the user; or completely match the text of the mail content with the contact name in the address book after the user finishes editing all the mail content. The complete matching may be used to judge whether the text of the mail content edited by the user contains the contact name, and if so, the characters in the text of the mail content containing the contact name are the CC matched characters.

In this embodiment, the CC matched characters accurately matched with the contact name can be obtained by completely matching the text of the mail content with the contact name.

And/or

II. Partially matching the text of the mail content with the given name of the contact name to obtain the CC matched characters in the mail content.

In this embodiment, since the family name and the given name of the contact name may be edited respectively when editing the address book by some mobile terminals, while the mail content may only include the given name of the contact name when editing the mail content by the user, the text of the mail content may be partially matched with the given name of the contact name to obtain the CC matched characters in the mail content.

In this embodiment, the text of the mail content is partially matched with the given name of the contact name. For the detailed matching process, please refer to the process of completely matching the text of the mail content edited by the user with the contact name in the address book, and herein is not detailed.

In this embodiment, in order to save the matching time for the mobile terminal to match the mail content edited by the user with the contact name, the partial matching may be only performed for the mail content other than the CC matched characters obtained through the complete matching; the partial matching may also be performed for all mail content edited by the user, including the CC matched characters obtained through the complete matching, and herein is not detailed.

In this embodiment, CC matched characters accurately matched with the contact name can be obtained by completely matching the text of the mail content with the contact name; and CC matched characters fuzzily matched with the contact name can be obtained by partially matching the text of the mail content with the given name of the contact name.

In this embodiment, the process of matching the text of the mail content with the contact name may include the complete matching only, the partial matching only, or both the complete matching and the partial matching, which is not detailed herein.

Step 407: adding an identification mark to the CC matched characters.

In this embodiment, in order that the user acquires which characters in the mail content edited by the user are the CC matched characters, after obtaining the CC matched characters by matching the mail content with the contact information, the mobile terminal add the identification mark to the CC matched characters.

In this embodiment, step 407 may add the identification mark to the CC matched characters as follows: adding an underline to the CC matched characters; or adding a background color to the CC matched characters so that the CC matched characters are highlighted; or changing the CC matched characters into icon buttons, so that the user identifies which characters in the mail content are the CC matched characters.

In this embodiment, there may be other methods for adding the identification mark to the CC matched characters, and herein are not detailed.

Step 408: linking the CC matched characters added with the identification mark to corresponding contact information of the CC matched characters.

Step 409: acquiring correct CC information from more than one piece of corresponding contact information of the CC matched characters.

In this embodiment, the mobile terminal may display the more than one piece of corresponding contact information of the CC matched characters in a list on the user edit page. The user shall select one or more pieces of correct CC information from the more than one piece of contact information, so that the mobile terminal acquires the correct CC information from the more than one piece of corresponding contact information of the CC matched characters.

In this embodiment, step 409 may acquire the correct CC information, along with the obtaining of the CC matched characters from the text of the mail content being edited by the user; or acquire the correct CC information after the mail is finished editing and the CC matched characters of all the mail content edited by the user are obtained, which is not detailed herein.

In this embodiment, step 408 links the CC matched characters added with the identification mark to corresponding contact information of the CC matched characters, so that after the user performs a certain operation on the CC matched characters added with the identification mark, the mobile terminal displays corresponding contact information of the CC matched characters. In which, the operation may include shortly clicking the CC matched characters added with the identification mark, and herein is not detailed.

Step 410: adding the correct CC information into the CC list corresponding to the mail content.

In this embodiment, step 410 may add the correct CC information into the CC list. When the mail is to be sent, the program for invoking the contact is needed to obtain corresponding contact way of the contact; or the contact way of the contact corresponding to the correct CC information may be directly added into the CC list; the mobile terminal may also acquire the contact information in other manners, which are not detailed herein.

In this embodiment, when step 409 acquires multiple pieces of correct CC information and step 410 adds the correct CC information into the CC list, the CC list may display the respective pieces of CC information with a list, or using separators, or in other manners, which are not detailed herein.

In this embodiment, when the mail to be sent by the user with the mobile terminal is a newly created mail or a forwarded mail, the mobile terminal may match the first line/text of the mail content edited by the user with the contact information in the address book, acquire the correct recipient/CC information from corresponding contact information of the recipient/CC matched characters, and add it into the recipient/CC list, thereby realizing intelligently adding the recipient information according to the message content edited by the user.

In the recipient information adding method provided by the embodiment of the present invention, the recipient information can be added according to the message content edited by the user regardless of whether the first line/text of the message content edited by the user contains the family name and the given name of the recipient/CC, or only the given name of the recipient/CC, or the contact group name, thereby improving the user experiences.

The recipient information adding method provided by the embodiment of the present invention obtains recipient/CC matched characters by matching the first line/text of the mail content edited by the user with the contact information, acquires corresponding contact information of the recipient/CC matched characters, and adds it into the recipient/CC list, thereby realizing adding the recipient information according to the message content edited by the user. The embodiment of the present invention solves the problem in the prior art that the recipient information cannot be added according to the message content edited by the user which is not detailed herein.

Figure 7:
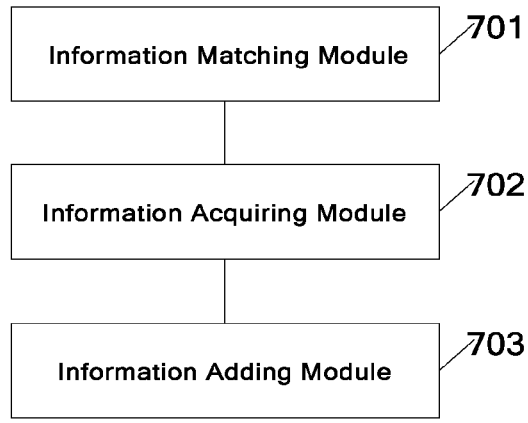
FIG. 7 is structure diagram 1 of an recipient information adding apparatus provided by Embodiment 7 of the present invention.

As illustrated in FIG. 7, the recipient information adding apparatus provided by Embodiment 7 of the present invention includes an message matching module 701, an message acquiring module 702 and an message adding module 703.

The information matching module 701 is configured to match message content edited by a user with contact information in an address book to obtain matched characters in the message content.

In this embodiment, the process of matching the message content edited by the user with the contact information in the address book by the information [[name]] matching module 701 may include: acquiring the message content edited by the user, and acquiring the contact information in the address book; comparing the message content with the contact information, and when the characters contained in the message content include the characters contained in the contact information, the characters contained in the message content are the matched characters.

In this embodiment, the information [[name]] matching module 701 may timely match the message content edited by the user with the contact information in the address book, along with the message content being edited by the user; or match the message content with the contact information in the address book after the user finishes editing all the message content. The information [[name]] matching module 701 may be used to judge whether the message content edited by the user contains the contact information, and if so, the characters in the message content containing the contact information are the matched characters. In which, the message content edited by the user may include short messages, multimedia messages, mail content, etc., which is not detailed herein.

The information acquiring module 702 is configured to acquire from the address book corresponding contact information of the matched characters obtained by the information matching module.

In this embodiment, after obtaining the matched characters by matching the message content edited by the user, the mobile terminal may start a program for invoking the contact, so as to acquire from the address book corresponding contact information of the matched characters.

The information adding module 703 is configured to add corresponding contact information of the matched characters obtained by the information acquiring module into an recipient list corresponding to the message content.

In this embodiment, the information adding module 703 may add corresponding contact information of the matched characters into the recipient list. When the information is to be transmitted, the program for invoking the contact is needed to obtain corresponding contact way of the contact; or the contact way of the contact corresponding to corresponding contact information of the matched characters may be directly added into the recipient list; the mobile terminal may also acquire the contact information in other manners, which are not detailed herein.

Further, the information matching module in the recipient information adding apparatus provided by the embodiment of the present invention may further include: at least one of a first complete matching submodule and a first partial matching submodule.

In which, the first complete matching submodule is configured to completely match the message content with the contact name in the contact information.

In this embodiment, the process of completely matching the message content edited by the user with the contact name by the first complete matching submodule may include: acquiring the message content edited by the user, and acquiring the contact name in the contact information; comparing the message content with the contact name, and when the characters contained in the message content include all the characters contained in the contact name, the characters contained in the message content are the matched characters.

In this embodiment, the first complete matching submodule may timely and completely match the message content edited by the user with the contact name in the address book, along with the message content being edited by the user; or completely match the message content with the contact name in the address book after the user finishes editing all the message content. The first complete matching submodule may be used to judge whether the message content edited by the user contains the contact name, and if so, the characters in the message content containing the contact name are the matched characters.

In this embodiment, the first complete matching submodule can obtain matched characters accurately matched with the contact name by completely matching the message content with the contact name.

The first partial matching submodule is configured to partially match the message content with given name of the contact name in the contact information.

In this embodiment, since the family name and the given name of the contact name may be edited respectively when editing the address book by some mobile terminals, while the information content may only include the given name of the contact name when editing the message content by the user, the message content may be partially matched with the given name of the contact name to obtain the matched characters in the message content.

In this embodiment, the first partial matching submodule partially matches the message content with the given name of the contact name. For the detailed matching process, please refer to the process of completely matching the message content edited by the user with the contact name in the contact information by the first complete matching submodule, and herein is not detailed.

In this embodiment, in order to save the matching time for the mobile terminal to match the message content edited by the user with the contact name, the partial matching may be only performed for the message content other than the matched characters obtained through the complete matching; the partial matching may also be performed for all message content edited by the user, including the matched characters obtained through the complete matching, and herein is not detailed.

In this embodiment, the first complete matching submodule can obtain matched characters accurately matched with the contact name by completely matching the message content with the contact name; and the first partial matching submodule can obtain matched characters fuzzily matched with the contact name by partially matching the message content with the given name of the contact name.

Further, the information adding module in the recipient information adding apparatus provided by the embodiment of the present invention may further include: a first information [[name]] acquiring submodule and a first adding submodule.

In which, the first information acquiring submodule is configured to acquire correct contact information from more than one piece of corresponding contact information of the matched characters.

In this embodiment, the mobile terminal may display the more than one piece of corresponding contact information of the matched characters in a list on the user edit page. The user shall select one or more pieces of correct contact information from the more than one piece of contact information, so that the mobile terminal acquires the correct contact information from the more than one piece of corresponding contact information of the matched characters.

In this embodiment, the first information [[name]] acquiring submodule may acquire the correct contact information, along with the obtaining of the matched characters from the message content being edited by the user; or acquire the correct contact information after the information is finished editing and the matched characters of all the message content edited by the user are obtained, which is not detailed herein.

The first adding submodule is configured to add the correct contact information into the recipient list corresponding to the message content.

In this embodiment, the first adding submodule may add the correct contact information into the recipient list. When the information is to be transmitted, the program for invoking the contact is needed to obtain corresponding contact way of the contact; or the contact way of the contact corresponding to the correct contact information may be directly added into the recipient list; the mobile terminal may add the contact information in other manners which are not detailed herein.

In this embodiment, when the first information [[name]] acquiring submodule acquires multiple pieces of correct contact information and the first adding submodule adds the correct contact information into the recipient list, the recipient list may display the respective pieces of contact information with a list, or using separators, or in other manners, which are not detailed herein.

Figure 8:
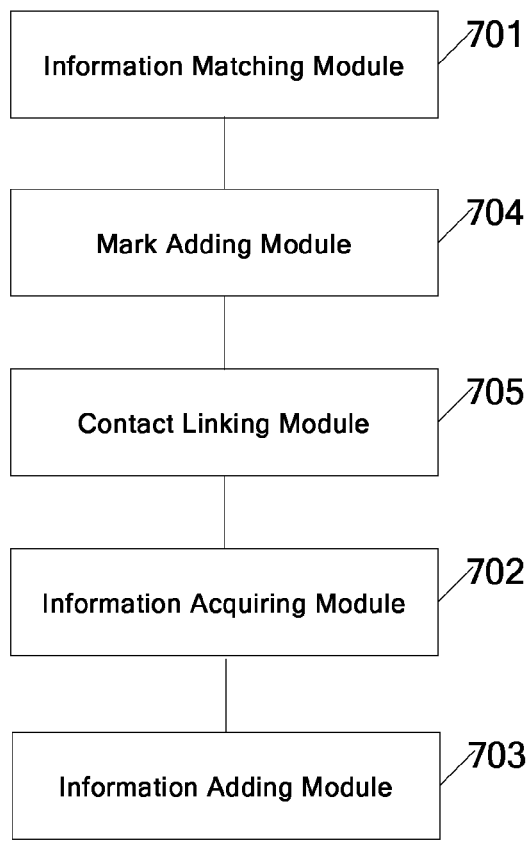
FIG. 8 is structure diagram 2 of an recipient information adding apparatus provided by Embodiment 7 of the present invention.

Further, as illustrated in FIG. 8, the recipient information adding apparatus provided by the embodiment may further include: a mark adding module 704 and a contact linking module 705.

The mark adding module 704 is configured to add an identification mark to the matched characters.

In this embodiment, in order that the user acquires which characters in the message content edited by the user are the matched characters, after obtaining the matched characters by matching the message content with the contact information, the mobile terminal adds the identification mark to the matched characters.

In this embodiment, the mark adding module 704 may add the identification mark to the matched characters as follows: adding an underline to the matched characters; or adding a background color to the matched characters so that the matched characters are highlighted; or changing the matched characters into icon buttons, so that the user identifies which characters in the message content are the matched characters.

In this embodiment, there may be other methods for adding the identification mark to the matched characters, and herein are not detailed.

The contact linking module 705 is configured to link the matched characters added with the identification mark to corresponding contact information of the matched characters.

In this embodiment, the contact linking module 705 links the matched characters added with the identification mark to corresponding contact information of the matched characters, so that after the user performs a certain operation on the matched characters added with the identification mark, the mobile terminal displays corresponding contact information of the matched characters. In which, the operation may include shortly clicking the matched characters added with the identification mark, and herein is not detailed.

In this embodiment, when the information to be transmitted by the user with the mobile terminal is newly created information or forwarded information, the mobile terminal may match the message content edited by the user with the contact information in the address book, acquire the correct contact information from corresponding contact information of the matched characters, and add it into the recipient list, thereby realizing intelligently adding the recipient information according to the message content edited by the user.

In the recipient information adding apparatus provided by the embodiment of the present invention, the recipient information can be added according to the message content edited by the user regardless of whether the message content edited by the user contains the family name and the given name of the recipient, or only the given name of the recipient, or the contact group name, thereby improving the user experiences.

The recipient information adding apparatus provided by the embodiment of the present invention can add the recipient information according to the message content edited by the user. When the user does not want to use the recipient information adding apparatus provided by the embodiment of the present invention, he also can input the recipient information into the recipient list word for word, or import corresponding recipient information from the address book, herein is not detailed.

In this embodiment, the message content edited by the user may include short messages, multimedia messages, mail content, etc., which is not detailed herein. When the contact information is a contact name, the contact name may be added into the recipient list; and when the contact information is a contact group name, all contact names in the contact group may be added into the recipient list, which is not detailed herein.

The recipient information adding apparatus provided by the embodiment of the present invention obtains matched characters by matching the message content edited by the user with the contact information, acquires corresponding contact information of the matched characters, and adds it into the recipient list, thereby realizing adding the recipient information according to the message content edited by the user. The embodiment of the present invention solves the problem in the prior art that the recipient information cannot be added according to the message content edited by the user.

Figure 9:
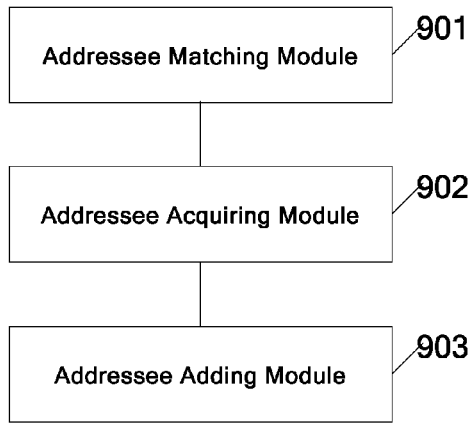
FIG. 9 is structure diagram 1 of an recipient information adding apparatus provided by Embodiment 8 of the present invention.

As illustrated in FIG. 9, the recipient information adding apparatus provided by Embodiment 8 may include: an recipient matching module 901, an recipient acquiring module 902, and an recipient adding module 903.

The recipient matching module 901 is configured to match a first line of a mail content edited by a user with contact information in an address book to obtain recipient matched characters in the mail content.

In this embodiment, the process of matching the first line of the mail content edited by the user with the contact name in the address book by the recipient matching module 901 may include: acquiring the first line of the mail content edited by the user, and acquiring the contact information in the address book; comparing the first line of the mail content with the contact information, and when the characters contained in the first line of the mail content include the characters contained in the contact information, the characters contained in the first line of the mail content are the recipient matched characters.

In this embodiment, the recipient matching module 901 may timely match the first line of the mail content edited by the user with the contact information in the address book, along with the mail content being edited by the user; or match the first line of the mail content with the contact information in the address book after the user finishes editing all the mail content. The recipient matching module 901 may be used to judge whether the first line of the mail content edited by the user contains the contact information, and if so, the characters in the mail content containing the contact information are the recipient matched characters.

The recipient acquiring module 902 is configured to acquire from the address book corresponding contact information of the recipient matched characters obtained by the recipient matching module.

In this embodiment, after obtaining the recipient matched characters by matching the first line of the mail content edited by the user, the mobile terminal may start a program for invoking the contact, so as to acquire corresponding contact information of the recipient matched characters from the address book.

The recipient adding module 903 is configured to add corresponding contact information of the recipient matched characters obtained by the recipient acquiring module into an recipient list corresponding to the mail content.

In this embodiment, the recipient adding module 903 may add corresponding contact information of the recipient matched characters into the recipient list. When the information is to be transmitted, the program for invoking the contact is needed to obtain corresponding contact way of the contact; or the contact way of the contact corresponding to corresponding contact information of the recipient matched characters may be directly added into the recipient list; the mobile terminal may also acquire the contact information in other manners, which are not detailed herein.

In this embodiment, when the contact information is a contact name, the contact name may be added into the recipient list; and when the contact information is a contact group name, all contact names in the contact group may be added into the recipient list, which is not detailed herein.

Figure 10:
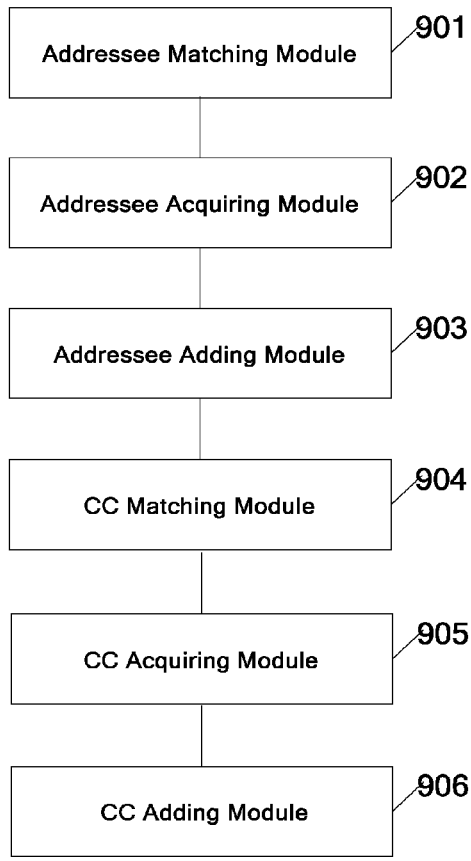
FIG. 10 is structure diagram 2 of an recipient information adding apparatus provided by Embodiment 8 of the present invention.

Further, as illustrated in FIG. 10, the recipient information adding apparatus of this embodiment may further include: a CC matching module 904, a CC acquiring module 905 and a CC adding module 906.

The CC matching module 904 is configured to match the text of the mail content edited by the user with the contact information to obtain CC matched characters in the mail content.

In this embodiment, the process of matching the text of the mail content edited by the user with the contact information in the address book by the CC matching module 904 may include: acquiring the text of the mail content edited by the user, and acquiring the contact information in the address book; comparing the text of the mail content with the contact information, and when the characters contained in the text of the mail content include the characters contained in the contact information, the characters contained in the text of the mail content are the CC matched characters.

In this embodiment, the CC matching module 904 may timely match the text of the mail content edited by the user with the contact information in the address book, along with the mail content being edited by the user; or match the text of the mail content with the contact information in the address book after the user finishes editing all the mail content. The CC matching module 904 may be used to judge whether the text of the mail content edited by the user contains the contact information, and if so, the characters in the mail content containing the contact information are the CC matched characters.

The CC acquiring module 905 is configured to acquire from the address book corresponding contact information of the CC matched characters obtained by the CC matching module.

In this embodiment, after obtaining the CC matched characters by matching the text of the mail content edited by the user, the mobile terminal may start a program for invoking the contact, so as to acquire corresponding contact information of the CC matched characters from the address book.

The CC adding module 906 is configured to add corresponding contact information of the CC matched characters obtained by the CC acquiring module into a CC list corresponding to the mail content.

In this embodiment, the CC adding module 906 may add corresponding contact information of the CC matched characters into the CC list. When the mail is to be transmitted, the program for invoking the contact is needed to obtain corresponding contact way of the contact; or the contact way of the contact corresponding to corresponding contact information of the CC matched characters may be directly added into the CC list; the mobile terminal may also add the contact information in other manners, which are not detailed herein.

Further, the recipient/CC matching module in the recipient information adding apparatus provided by this embodiment may further include: at least one of a second complete matching submodule and a second partial matching submodule.

In which, the second complete matching submodule is configured to completely match the first line/text of the mail content with the contact name in the contact information.

In this embodiment, the process of completely matching the first line/text of the mail content edited by the user with the contact name in the address book by the second complete matching submodule may include: acquiring the first line/text of the mail content edited by the user, and acquiring the contact name in the address book; comparing the first line/text of the mail content with the contact name, and when the characters contained in the mail content include all the characters contained in the contact name, the characters contained in the first line/text of the mail content are the recipient/CC matched characters.

In this embodiment, the second complete matching submodule may timely and completely match the first line/text of the mail content edited by the user with the contact name in the address book, along with the mail content being edited by the user; or completely match the first line/text of the mail content with the contact name in the address book after the user finishes editing all the mail content. The second complete matching submodule may be used to judge whether the first line/text of the mail content edited by the user contains the contact name, and if so, the characters in the first line/text of the mail content containing the contact name are the recipient/CC matched characters.

In this embodiment, the second complete matching submodule can obtain the recipient/CC matched characters accurately matched with the contact name by completely matching the first line/text of the mail content with the contact name.

The second partial matching submodule is configured to partially match the first line/text of the mail content with the given name of the contact name in the contact information.

In this embodiment, since the family name and the given name of the contact name may be edited respectively when editing the address book by some mobile terminals, while the mail content may only include the given name of the contact name when editing the mail content by the user, the first line/text of the mail content may be partially matched with the given name of the contact name by the second partial matching submodule to obtain the recipient/CC matched characters in the mail content.

In this embodiment, the second partial matching submodule partially matches the first line/text of the mail content with the given name of the contact name. For the detailed matching process, please refer to the process of completely matching the first line/text of the mail content edited by the user with the contact name in the address book by the second complete matching submodule, and herein is not detailed.

In this embodiment, in order to save the matching time for the mobile terminal to match the mail content edited by the user with the contact name, the second partial matching submodule may only match the mail content other than the recipient/CC matched characters obtained by the second complete matching submodule; the second partial matching submodule may also partially match all mail content edited by the user, including the recipient/CC matched characters obtained by the second complete matching submodule, and herein is not detailed.

In this embodiment, the second complete matching submodule can obtain recipient/CC matched characters accurately matched with the contact name by completely matching the first line/text of the mail content with the contact name; and the second partial matching submodule can obtain recipient/CC matched characters fuzzily matched with the contact name by partially matching the first line/text of the mail content with the given name of the contact name.

Further, the recipient/CC adding module in the recipient information adding apparatus provided by the embodiment of the present invention may further include: a second information [[name]] acquiring submodule and a second adding submodule.

In which, the second information acquiring submodule is configured to acquire correct recipient/CC information from more than one piece of corresponding contact information of the recipient/CC matched characters.

In this embodiment, the mobile terminal may display the more than one piece of corresponding contact information of the recipient matched characters in a list on the user edit page. The user shall select one or more pieces of correct recipient/CC information from the more than one piece of contact name, so that the mobile terminal acquires the correct recipient/CC information from the more than one piece of corresponding contact information of the recipient matched characters.

In this embodiment, the second information acquiring submodule may acquire the correct recipient/CC information, along with the obtaining of the recipient/CC matched characters from the first line of the mail content being edited by the user; or acquire the correct recipient/CC information after the mail content is finished editing and the recipient/CC matched characters of all the mail content edited by the user are obtained, which is not detailed herein.

The second adding submodule is configured to add the correct recipient/CC information into the recipient/CC list corresponding to the mail content.

In this embodiment, the second adding submodule may add the correct recipient/CC information into the recipient/CC list. When the mail is to be sent, the program for invoking the contact is needed to obtain corresponding contact way of the contact; or the contact way of the contact corresponding to the correct recipient/CC information may be directly added into the recipient/CC list; the mobile terminal may also add the contact information in other manners, which are not detailed herein.

In this embodiment, when the second information acquiring submodule acquires multiple pieces of correct recipient/CC information and the second adding submodule adds the correct recipient/CC information into the recipient/CC list, the recipient/CC list may display respective pieces of recipient/CC information with a list, or using separators, or in other manners, which are not detailed herein.

In this embodiment, when the mail to be sent by the user with the mobile terminal is a newly created mail or a forwarded mail, the mobile terminal may match the first line/text of the mail content edited by the user with the contact information in the address book, acquire the correct recipient/CC information from corresponding contact information of the recipient/CC matched characters, and add it into the recipient/CC list, thereby realizing intelligently adding the recipient information according to the message content edited by the user.

In the recipient information adding apparatus provided by the embodiment of the present invention, the recipient information can be added according to the message content edited by the user regardless of whether the first line/text of the mail content edited by the user contains the family name and the given name of the recipient/CC, or only the given name of the recipient/CC, or the contact group name, thereby improving the user experiences.

The recipient information adding apparatus provided by the embodiment of the present invention can add the recipient/CC information according to the message content edited by the user. When the user does not want to use the recipient information adding apparatus provided by the embodiment of the present invention, he also can input the recipient/CC information into the recipient list word for word, or import corresponding recipient/CC information from the address book, which is not detailed herein.

The recipient information adding apparatus provided by the embodiment of the present invention obtains the recipient/CC matched characters by matching the first line/text of the mail content edited by the user with the contact information, acquires corresponding contact information of recipient/CC matched characters, and adds it into the recipient/CC list, thereby adding the recipient information according to the message content edited by the user. The embodiment of the present invention solves the problem in the prior art that the recipient information cannot be added according to the message content edited by the user.

In order that a person skilled in the art more clearly understands the technical solutions of the present invention, the recipient information adding method and apparatus are specifically described in Embodiment 9 of the present invention.

It is assumed that the contact names in the address book include: mom, Zhang Yifei, Li Yifei, Wang Xiaoming, Lu Fen, Li Hao and Meng Fei, wherein the family names and the given names of Zhang Yifei, Li Yifei, Wang Xiaoming and Meng Fei may be stored in the address book, respectively, and the given names in the contact names include Yifei, Xiaoming and Fei; the contact group names include: family including the mom; and classmates including Zhang Yifei and Li Yifei.

Figure 11:
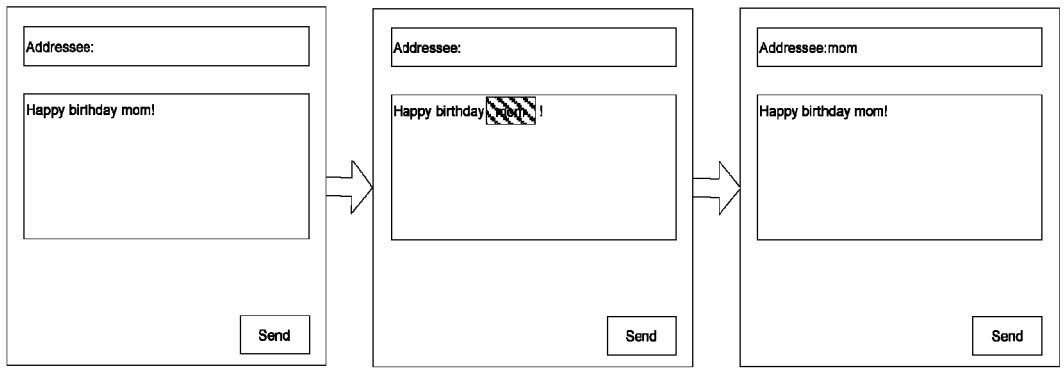
FIG. 11 is schematic diagram 1 of an recipient information adding method provided by Embodiment 9 of the present invention.

When the message content edited by the user is "happy birthday mom", the mobile terminal matches the message content edited by the user with the contact information in the address book to obtain that the matched character is "mom"; an identification mark is added to the matched character "mom", and corresponding contact information of the matched character "mom" is still "mom"; and the addition of the recipient information can be achieved by adding "mom" into the recipient list. The specific process of adding the recipient information may be as shown in FIG. 11.

Figure 12:
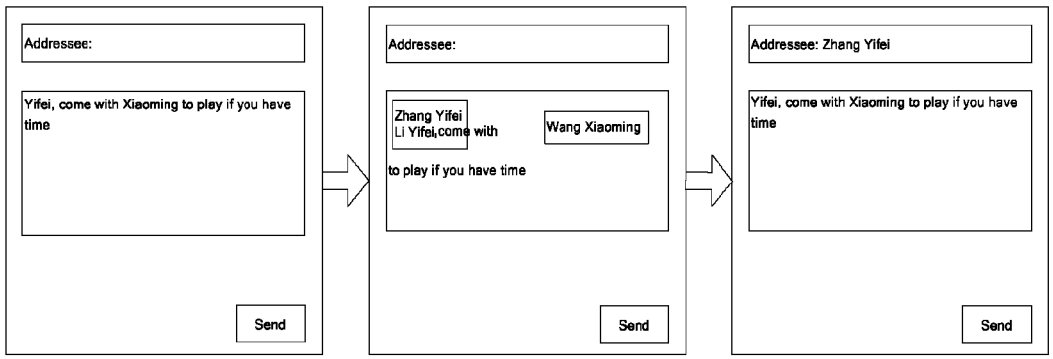
FIG. 12 is schematic diagram 2 of an recipient information adding method provided by Embodiment 9 of the present invention.

When the message content edited by the user is "Yifei, come with Xiaoming to play if you have time", the mobile terminal matches the message content edited by the user with the contact information in the address book to obtain the matched characters as "Yifei" and "Xiaoming"; identification marks are added to the matched characters "Yifei" and "Xiaoming"; corresponding contact information of "Yifei" and "Xiaoming" is displayed as "Zhang Yifei, Li Yifei, Wang Xiaoming"; assuming that the correct contact information is Zhang Yifei, then "Zhang Yifei" is acquired from "Zhang Yifei, Li Yifei, Wang Xiaoming" based on the selection of the user, and added "Zhang Yifei" into the recipient list. The specific process of adding the recipient information may be as shown in FIG. 12.

Figure 13:
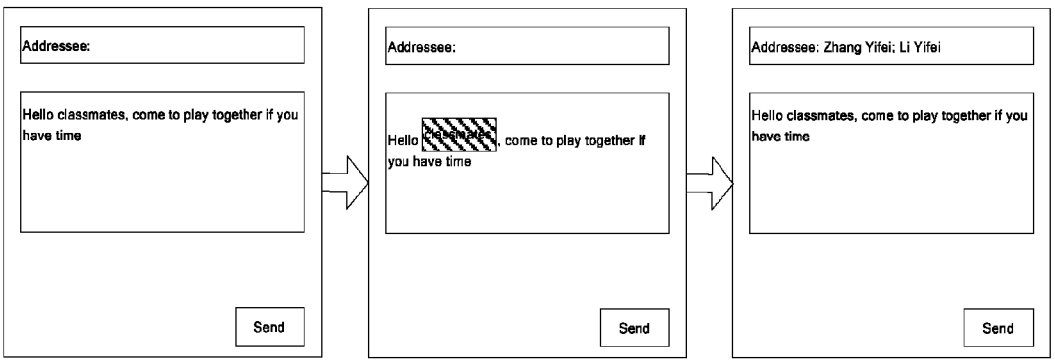
FIG. 13 is schematic diagram 3 of an recipient information adding method provided by Embodiment 9 of the present invention.

When the message content edited by the user is "Hello classmates, come to play together if you have time", the mobile terminal matches the message content edited by the user with the contact information in the address book to obtain the matched character as "classmates"; an identification mark is added to the matched character "classmates", and corresponding contact information of the matched character "classmates" is displayed as "classmates"; and "Zhang Yifei" and "Li Yifei" in the "classmates" group are added into the recipient list. The specific process of adding the recipient information may be as shown in FIG. 13.

When an Email is to be sent and the mail content edited by the user is

Figure 14:
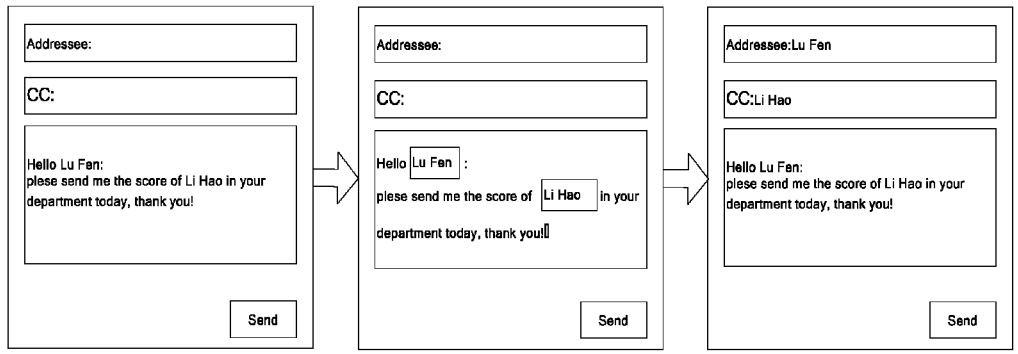
FIG. 14 is schematic diagram 4 of an recipient information adding method provided by Embodiment 9 of the present invention.

"Hello Lu Fen:

[[plese]] please send me the score of Li Hao in your department today, thank you!", the mobile terminal matches the first line of the mail content edited by the user with the contact information in the address book to obtain that the recipient matched character is "Lu Fen"; and matches the text of the mail content edited by the user with the contact information in the address book to obtain the CC matched character as "Li Hao"; different identification marks are added to the recipient and CC matched characters "Lu Fen" and "Li Hao"; corresponding recipient and CC information of "Lu Fen" and "Li Hao" is displayed as "Lu Fen" and "Li Hao"; assuming that the correct recipient information is "Lu Fen", and the correct CC information is "Li Hao", then "Lu Fen" is added into the recipient list and "Li Hao" is added into the CC list. The specific recipient information adding method may be as shown in FIG. 14.

When an Email is to be sent and the mail content edited by the user is

Figure 15:
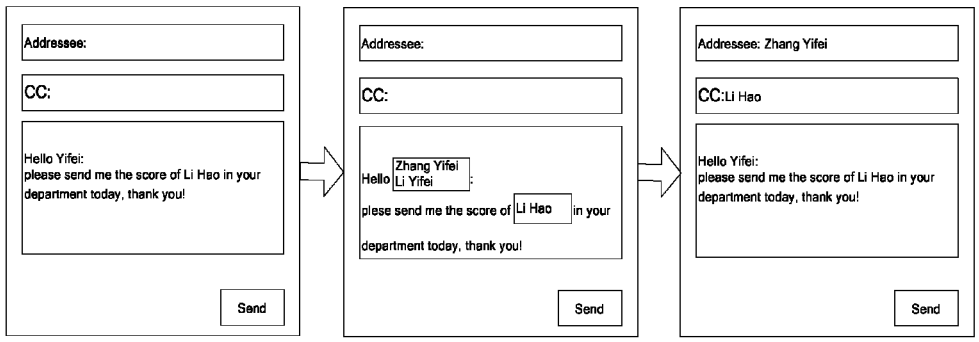
FIG. 15 is schematic diagram 5 of an recipient information adding method provided by Embodiment 9 of the present invention.

"Hello Yifei:

[[plese]] please send me the score of Li Hao in your department today, thank you!", the mobile terminal matches the first line of the mail content edited by the user with the contact information in the address book to obtain the recipient matched character as "Yifei"; and matches the text of the mail content with the contact information to obtain the CC matched character as "Li Hao"; different identification marks are added to the recipient and CC matched characters "Yifei" and "Li Hao"; corresponding recipient and CC information of "Yifei" and "Li Hao" is displayed as "Zhang Yifei, Li Yifei" and "Li Hao"; assuming that the correct recipient information is "Zhang Yifei", and the correct CC name is "Li Hao", then "Zhang Yifei" is added into the recipient list and "Li Hao" is added into the CC list. The specific recipient information adding method may be as shown in FIG. 15.

When an Email is to be sent and the mail content edited by the user is

Figure 16:
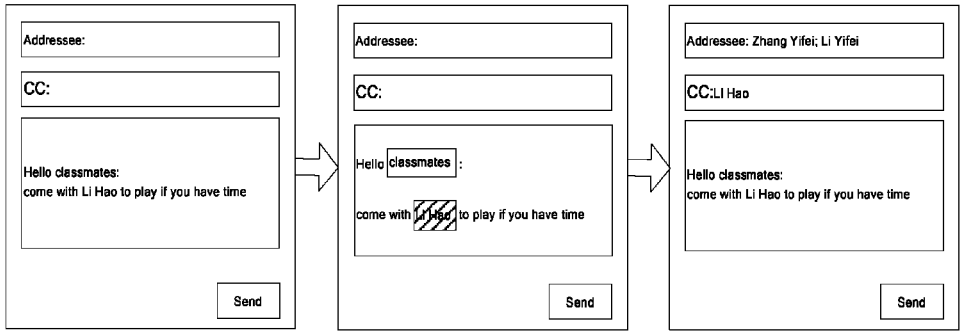
FIG. 16 is schematic diagram 6 of an recipient information adding method provided by Embodiment 9 of the present invention.

"Hello classmates:

come with Li Hao to play if you have time", the mobile terminal matches the first line of the mail content edited by the user with the contact information in the address book to obtain the recipient matched character as "classmates"; and matches the text of the mail content with the contact information to obtain that the CC matched character as "Li Hao"; different identification marks are added to the recipient and CC matched characters "classmates" and "Li Hao"; corresponding recipient and CC information of "classmates" and "Li Hao" is displayed as "classmates" and "Li Hao"; assuming that the correct recipient information is "classmates", and the correct CC name is "Li Hao", then "Zhang Yifei" and "Li Yifei" are added into the recipient list and "Li Hao" is added into the CC list. The specific recipient information adding method may be as shown in FIG. 16.

The recipient information adding apparatus provided by the embodiment of the present invention obtains the recipient/CC matched characters by matching the whole/first line/text of the message content edited by the user with the contact information, acquires corresponding contact information of the recipient/CC matched characters, and adds it into the recipient/CC list, thereby realizing adding the recipient information according to the message content edited by the user. The embodiment of the present invention solves the problem in the prior art that the recipient information cannot be added according to the message content edited by the user.

The recipient information adding method and apparatus provided by the embodiment of the present invention can be applied in the mobile terminals such as the cell phone.

The steps of the method or algorithm described in the embodiments disclosed herein may be directly implemented with hardware or software modules executed by a processor, or a combination thereof. The software modules may be disposed in Random Access Memory (RAM), memory, Read Only Memory (ROM), electrically programmable ROM, electrically erasable programmable ROM, register, hard disk, removable disk, CD-ROM or any other storage medium known in the technical field.

The above descriptions are just preferred embodiments of the present invention, and the protection scope of the present invention is not limited thereto. Any change or replacement that can be easily conceived by a person skilled in the art within the technical scope disclosed by the present invention shall fall within the protection scope of the present invention. Therefore, the protection scope of the present invention shall be determined by the protection scope of the claims.

The invention claimed is:

1. An recipient information adding method, comprising:
matching message content edited by a user with contact information in an address book to obtain matched characters in the message content, wherein the contact information comprises a contact name or a contact group name;
acquiring corresponding contact information of the matched characters from the address book; and
adding corresponding contact information of the matched characters into an recipient list corresponding to the message content,
wherein when said contact information comprises the contact group name, adding corresponding contact information of the matched characters into a recipient list corresponding to the message content further comprises populating the contact information for each member associated with the contact group name into said recipient list.

2. The recipient information adding method according to claim 1, wherein when there are more than one piece of corresponding contact information of the matched characters, adding corresponding contact information of the matched characters into the recipient list corresponding to the message content comprises:
acquiring correct contact information from the more than one piece of corresponding contact information of the matched characters; and
adding the correct contact information into the recipient list corresponding to the message content.

3. The recipient information adding method according to claim 1, wherein matching the message content edited by the user with the contact information in the address book comprises:
completely matching the message content with the contact name or the contact group name in the contact information; or
partially matching the message content with a given name of the contact name in the contact information.

4. An recipient information adding method, comprising:
matching a first line of a mail content edited by a user with contact information in an address book to obtain recipient matched characters in the mail content;
acquiring corresponding contact information of the recipient matched characters from the address book;
adding corresponding contact information of the recipient matched characters into an recipient list corresponding to the mail content;
matching text of the mail content edited by the user with the contact information to obtain CC matched characters in the mail content;
acquiring corresponding contact information of the CC matched characters from the address book;
adding corresponding contact information of the CC matched characters into a CC list corresponding to the mail content;
identifying, in the mail content edited by the user, the recipient matched characters with a first identification; and
identifying, in the mail content edited by the user, the CC matched characters with a second identification, wherein the first identification and second identification are different.

5. The recipient information adding method according to claim 4, wherein when there are more than one piece of corresponding contact information of the recipient or the CC matched characters,
adding corresponding contact information of the recipient matched characters into the recipient list corresponding to the mail content comprises: acquiring correct recipient information from the more than one piece of corresponding contact information of the recipient matched characters, and adding the correct recipient information into the recipient list corresponding to the mail content; and
adding corresponding contact information of the CC matched characters into the CC list corresponding to the mail content comprises: acquiring correct CC information from the more than one piece of corresponding contact information of the CC matched characters, and adding the correct CC information into the CC list corresponding to the mail content.

6. The recipient information adding method according to claim 4, wherein matching the first line or the text of the mail content edited by the user with the contact information comprises:
completely matching the first line or the text of the mail content with a contact name in the contact information; or
partially matching the first line or the text of the mail content with a given name of the contact name in the contact information.

7. The recipient information adding method according to claim 4, wherein the contact information comprises:
a contact name or a contact group name.

8. An recipient information adding apparatus, comprising:
a processor comprising hardware configured to:
match message content edited by a user with contact information in an address book to obtain matched characters in the message content, wherein the contact information comprises a contact name or a contact group name;
acquire from the address book corresponding contact information of the matched characters; and
add corresponding contact information of the matched characters into an recipient list corresponding to the message content, wherein when said contact information comprises the contact group name, the processor comprising hardware is configured to populate the contact information for each member associated with the contact group name into said recipient list.

9. The recipient information adding apparatus according to claim 8, wherein the processor comprising hardware is configured to:
completely match the message content with the contact name or the contact group name in the contact information; or
partially match the message content with a given name of the contact name in the contact information.

10. The recipient information adding apparatus according to claim 8, wherein the processor comprising hardware is further configured to:
acquire correct contact information from more than one piece of corresponding contact information of the matched characters; and
add the correct contact information into the recipient list corresponding to the message content.

11. An recipient information adding apparatus, comprising:

a processor comprising hardware configured to:
- match a first line of a mail content edited by a user with contact information in an address book to obtain recipient matched characters in the mail content;
- acquire from the address book corresponding contact information of the recipient matched characters;
- add corresponding contact information of the recipient matched characters into an recipient list corresponding to the mail content;
- match text of the mail content edited by the user with the contact information to obtain CC matched characters in the mail content;
- acquire from the address book corresponding contact information of the CC matched characters;
- add corresponding contact information of the CC matched characters into a CC list corresponding to the mail content;
- identify, in the mail content edited by the user, the recipient matched characters with a first identification; and
- identify, in the mail content edited by the user, the CC matched characters with a second identification, wherein the first identification and second identification are different.

12. The recipient information adding apparatus according to claim 11, wherein the processor comprising hardware is configured to:
- completely match the first line or the text of the mail content with a contact name in the contact information; or
- partially match the first line or the text of the mail content with a given name of the contact name in the contact information.

13. The recipient information adding apparatus according to claim 11, wherein the processor comprising hardware is further configured to:
- acquire correct recipient or CC information from more than one corresponding contact information of the recipient or the CC matched characters; and
- add the correct recipient/CC information into the recipient or the CC list corresponding to the mail content.

14. The recipient information adding method according to claim 1, wherein the matching message content edited by a user with contact information in an address book to obtain matched characters in the message content occurs in real time without waiting until the message content edited by the user is complete.

15. An recipient information adding method, comprising:
- matching message content edited by a user with contact information in an address book to obtain matched characters in the message content;
- acquiring corresponding contact information of the matched characters from the address book;
- adding corresponding contact information of the matched characters into an recipient list corresponding to the message content, wherein when there are more than one piece of corresponding contact information of the matched characters, adding corresponding contact information of the matched characters into the recipient list corresponding to the message content comprises:
- displaying, in the mail content edited by the user, at the location of the matched characters, a list including the more than one piece of corresponding contact information of the matched characters;
- acquiring correct contact information from the more than one piece of corresponding contact information of the matched characters; and
- adding the correct contact information into the recipient list corresponding to the message content.

16. An recipient information adding apparatus, comprising:
a processor comprising hardware configured to:
- match message content edited by a user with contact information in an address book to obtain matched characters in the message content;
- acquire from the address book corresponding contact information of the matched characters; and
- add corresponding contact information of the matched characters into an recipient list corresponding to the message content,
- wherein when there are more than one piece of corresponding contact information of the matched characters, the processor comprising hardware is further configured to:
- display, in the mail content edited by the user, at the location of the matched characters, a list including the more than one piece of corresponding contact information of the matched characters;
- acquire correct contact information from the more than one piece of corresponding contact information of the matched characters; and
- add the correct contact information into the recipient list corresponding to the message content.

* * * * *